United States Patent [19]

Lefebvre et al.

[11] Patent Number: 5,513,526
[45] Date of Patent: May 7, 1996

[54] HYDROFOIL FORCE BALANCE

[75] Inventors: Paul J. Lefebvre, Tiverton; William P. Barker, Bristol, both of R.I.

[73] Assignee: The United States of America as represented by the Secretary of the Navy, Washington, D.C.

[21] Appl. No.: 279,037

[22] Filed: Jul. 20, 1994

[51] Int. Cl.⁶ .................................. G01L 5/16; G01M 9/00
[52] U.S. Cl. .......................... 73/147; 73/802; 73/861.71
[58] Field of Search ............................... 73/862.05, 818, 73/802, 768, 832, 861.71, 147

[56] References Cited

U.S. PATENT DOCUMENTS

| | | | |
|---|---|---|---|
| 2,885,891 | 5/1959 | Wilson et al. | 73/147 |
| 3,019,643 | 2/1962 | Curry | 73/147 |
| 3,460,383 | 8/1969 | Padera | 73/147 |
| 3,552,201 | 1/1971 | Horanoff | 73/147 |
| 4,019,375 | 4/1977 | Ellis et al. | 73/802 |
| 4,534,216 | 8/1985 | Fasano et al. | 73/147 |
| 4,682,494 | 7/1987 | Reed | 73/147 |
| 5,056,361 | 10/1991 | Roberts | 73/147 |
| 5,201,218 | 4/1993 | Mole | 73/147 |

*Primary Examiner*—Richard Chilcot
*Assistant Examiner*—George M. Dombroske
*Attorney, Agent, or Firm*—Michael J. McGowan; Prithvil C. Lall; Michael F. Oglo

[57] ABSTRACT

The present invention relates to measuring device for measuring a component of a force acting on a test body, such as a hydrofoil, positioned within a testing apparatus. The measuring device has a test body formed by a foil shaped center section and two adjacent end sections. Each end section is joined to the center section by a flexure member having sufficient stiffness so that there is negligible relative motion between the center section and the end sections as a fluid medium flows past the center section. At least one strain gauge is mounted to at least one flexure member to measure the forces acting on the center section. A method for measuring the load on a test body is also described.

9 Claims, 3 Drawing Sheets

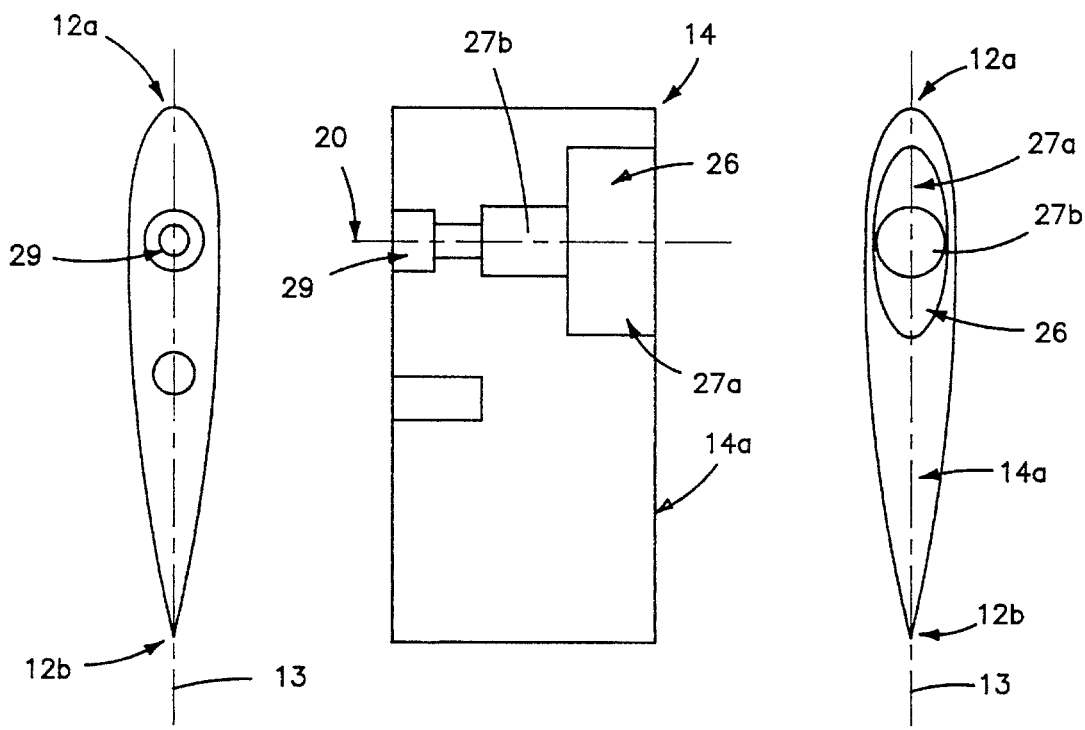
FIG-4c    FIG-4a    FIG-4b
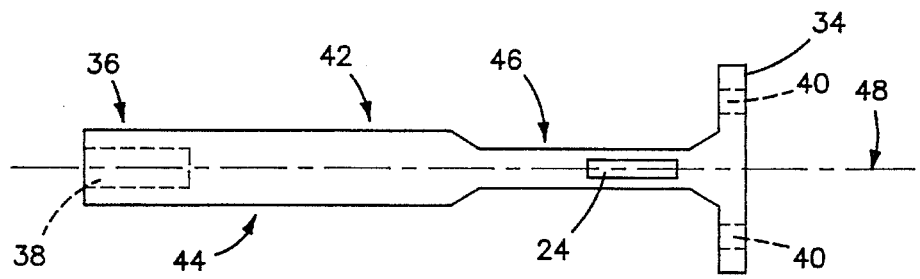
FIG-5a
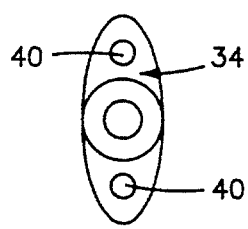   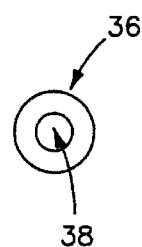   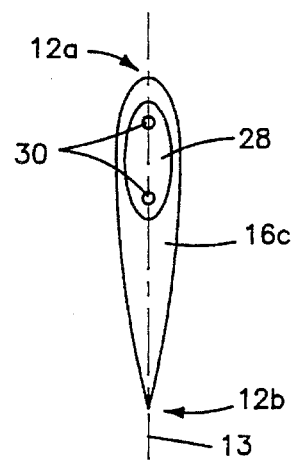
FIG-5b    FIG-5c    FIG-3b

HYDROFOIL FORCE BALANCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a measuring device which can directly measure a component of a force acting on a test body, in particular a foil shaped body in a flowing water tunnel, and to a method of using said measuring device.

(2) Description of the Prior Art

One apparatus for measuring forces from flowing air acting on a foil shaped body in a test tunnel is shown in FIG. 1. In this apparatus, the foil shaped body is pivotally mounted in the test tunnel housing. The top pin extends through a flexible connection outside the tunnel housing. The pin outside the housing is connected to a load cell, through linkage, which is used to measure the load or force on the foil. The flexible connection prevents flowing air from escaping which can cause the flow field incident to the foil to become destroyed or distorted. It is also common to see a large plate (i.e., large with respect to the size, chord length, of the foil) attached to the foil ends when the gap between the foil ends and the tunnel housing can cause the flow field to be distorted or destroyed.

Such an apparatus, however, is not usable in water test tunnels. The air tunnel flexible connection provides leak tightness when there is atmospheric pressure inside the tunnel. Such a flexible connection cannot withstand the pressures typically seen inside a water test tunnel (e.g., 50 psi). It is possible to strengthen the flexible connection so it can withstand the pressures involved. This, however, affects the accuracy of the measurements as well as the response time for making the measurement because the connection itself limits the motion of the pin.

This apparatus also cannot be adapted so that it can be easily located in the test tunnel. If the load cell structure was located inside the test tunnel, it would have to be isolated from the test body so the incident flow field would not be distorted or destroyed. As indicated above this is accomplished by affixing a large plate to the end where the flow disturbance can originate. This approach, however, results in a considerable portion of the test tunnel being used by the load cell structure. A small foil is then needed which is undesirable since load forces result and accuracy is degraded.

U.S. Pat. No. 5,036,361 to Roberts illustrates another apparatus for measuring forces from flowing air acting on a foil shaped body. The apparatus comprises a dual strain gage balance system for measuring normal and axial forces and pitching moment of a metric airfoil model imparted by aerodynamic loads applied to the airfoil model during wind tunnel testing. The system includes a pair of non-metric panels rigidly connected to and extending towards each other from opposite sides of the wind tunnel and a pair of strain gage balances, each connected to one of the non-metric panels and to one of the opposite ends of the metric airfoil model for mounting the metric airfoil model between the pair of non-metric panels. Each strain gage balance has a first measuring section mounting the first strain gage bridge and the second strain gage bridge means for measuring normal and pitching moment and a second measuring section mounting third strain gage means for measuring axial force.

The principal deficiency of the Roberts system is that a portion of the exterior surface of the foil must be removed by machining so that a flexure can be attached from the outside. A cover is then placed over the flexure to complete the foil's outer surface. This results in a discontinuity on the foil surface around the edges of the cover. Any such discontinuity may adversely affect both the flow field around the foil and the resulting accuracy of measurements.

U.S. Pat. Nos. 2,865,200 to Gieseler; 2,885,891 to Wilson et al.; 4,372,157 to Caruthers et al.; and 4,845,993 to Horne et al. illustrate various testing devices used in wind tunnel testing systems. U.S. Pat. No. 3,460,383 to Padera illustrates a system for measuring forces on control surfaces or fins of missiles which includes flexure areas on each side of the control surface closely adjacent its shaft. A plurality of strain measuring devices are disposed on the flexure areas so that the distortions of the flexure areas can be accurately translated into indications of forces and moments. All exhibit features which impede installation in water test tunnels.

The problems associated with these prior art measuring systems are overcome by the measuring device of the present invention.

SUMMARY OF THE INVENTION

Accordingly, it is an object of the present invention to provide a measuring device which can directly measure a component of a force acting on a test body, in particular a foil shaped body in a flowing water tunnel.

It is a further object of the present invention to provide a measuring device as above which can measure forces on a test body under transient fluid flow conditions.

It is still a further object of the present invention to provide a measuring device as above which can be integrated with the test body to be measured so that the measuring device does not disturb or destroy the flowing liquid field.

It is yet another object of the present invention to provide a measuring device as above which can quickly, simply and accurately measure force(s) acting on a body.

It is yet another object of the present invention to provide an improved method for measuring forces acting on a body.

The foregoing objects and advantages are attained by the measuring device of the present invention which comprises a measuring device for measuring a component of a force acting on a test body, such as a hydrofoil, positioned within a testing apparatus. The measuring device has a test body formed by a foil shaped center section and two adjacent end sections. Each end section is joined to the center section by a flexure member having sufficient stiffness so that there is negligible relative motion between the center section and the end sections as a fluid medium flows past the center section. At least one strain gauge is mounted to at least one flexure member to measure the forces acting on the center section.

A method for measuring loads on a test body using the measuring device of the present invention comprises the steps of: providing a test body; cutting the test body into three sections including two end sections and center sections; providing an aperture in two opposed sides of the center section and an aperture in each side of the end section opposite one of the apertures in the center section; providing each aperture step in the center section with a cross-sectional shape which complements the cross-sectional shape of a first end portion of a flexure member and further providing each aperture in the end section with a cross-sectional shape which complements a cross sectional shape of a second end portion of the flexure member; joining the center section to a respective one of said end sections by inserting said first end portion of the flexure member into a respective one of the apertures in the center section so that there is no relative motion between the first end portion of the flexure member and the center section and by inserting the second end portion of the flexure member into a respective aperture in an adjacent one of the end sections so that there is no relative motion between the second end portion of the flexure member and the end section; positioning the test body within the testing apparatus; causing a fluid medium to flow through the testing apparatus to impose loads and forces on the test body; and measuring at least one load imposed on the center section of the test body.

Other details of the measuring device and the method of the present invention are set out in the following description.

Other objects and advantages of the present invention will be made clearer in the following description and drawings wherein like reference numerals depict like elements.

BRIEF DESCRIPTION OF THE DRAWINGS

FIG. 3(b) is a sectional view of the center section taken along lines A—A in FIG. 3(a);

FIG. 4(a) is a top view of an inactive section of the test assembly of FIG. 2;

FIG. 4(b) is a first end view of the inactive section of FIG. 4(a);

FIG. 4(c) is a second end view of the inactive section of FIG. 4(a);

FIG. 5(a) is a plan view of a flexure rod assembly used in the test assembly of FIG. 2;

FIG. 5(b) is a first end view of the flexure rod assembly of FIG. 5(a); and

FIG. 5(c) is a second end view of the flexure rod assembly of FIG. 5(a).

DESCRIPTION OF THE PREFERRED EMBODIMENT

Figure 2:
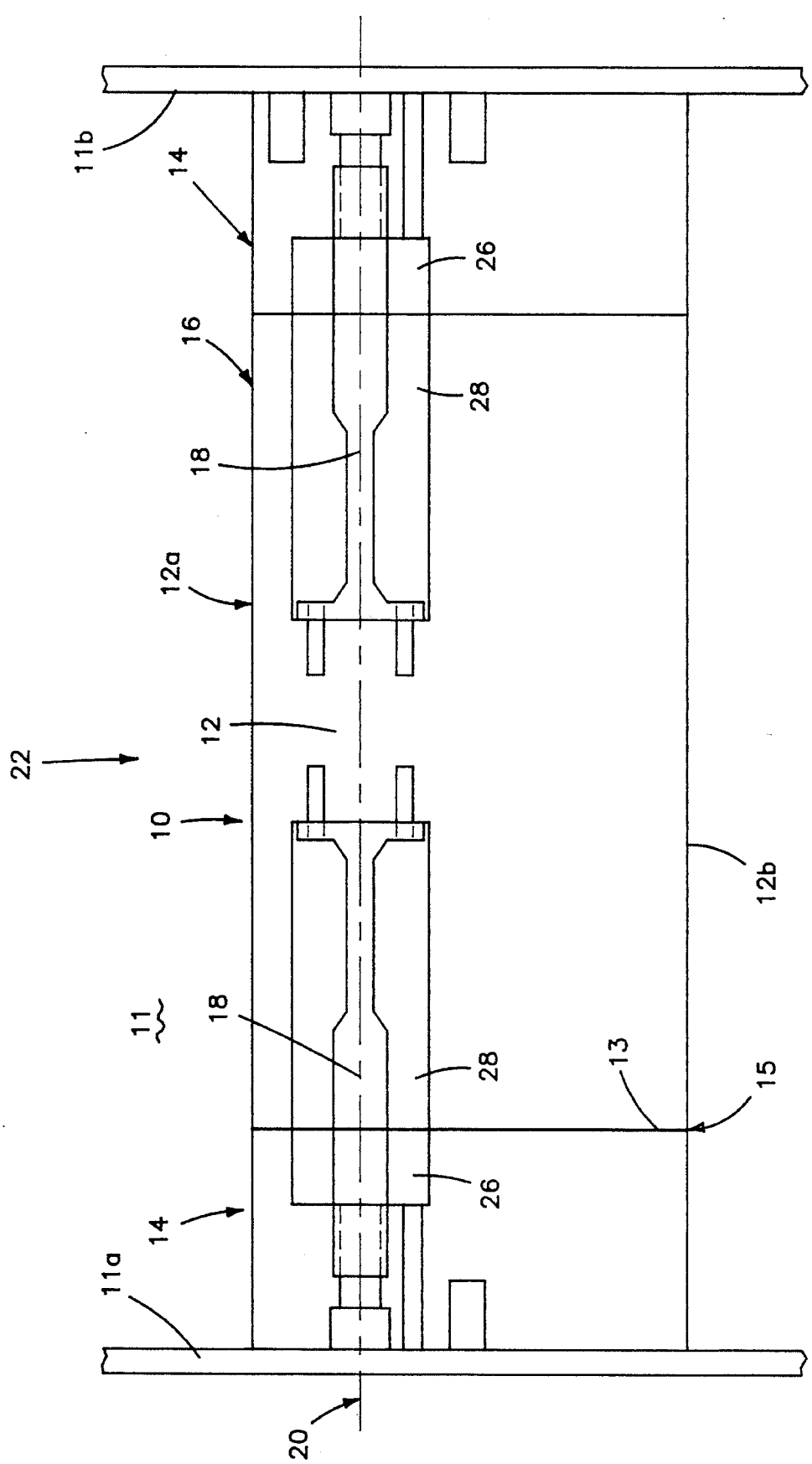
FIG. 2 illustrates a flexure test assembly for testing a hydrofoil in a water test tunnel.

Referring now to the drawings, a flexure test assembly 10 for testing a test body 12 such as a hydrofoil, in a water test tunnel 11 is shown in FIG. 2. The test body has a leading edge 12a and a trailing edge 12b. A chord line 13, as more clearly seen in FIGS. 3(b) and 4(b), extends between the leading and trailing edges 12a and 12b.

In accordance with the present invention, the test body 12 is cut cross-sectionally into two end sections 14 and a center section 16. The two end sections 14 can be referred to as inactive sections, while the center section 16 can be referred to as the active section. The end sections 14 and center section 16 are cut so that during testing the center section 16 does not see the effects on the flow field caused by the walls of the test tunnel. The sections are also cut so the force being measured on center section 16 is in an appropriate range. In the test mode, the two end sections 14 are pivotally mounted to walls 11a and 11b of the test tunnel 11; although, these sections are fixed in place during a test.

The center section 16 is secured to each end section 14 by a flexure rod 18. The flexure rod 18 is stiff enough so there is negligible relative motion between the center and end sections as fluid medium such as water flows past the test body in the direction 22. Relative motion between the sections is preferably limited to that which will not distort or destroy the incident flow field. Although illustrated as flowing parallel to the chord line 13, it should be recognized that the test body 12 can be oriented during a test so that the direction of fluid flow is at an angle with respect to the chord line. The angle of the test body with respect to the incident flow field may be referred to as the angle of attack.

As shown in FIG. 5(a), at least one of the flexure rods 18 contains a strain gauge 24 to detect and directly measure the force normal to the chord line 13 from the fluid medium flowing over the top surface 16a and the bottom surface 16b of the center section 16. If desired, a plurality of strain gauges may be mounted or affixed to the flexure rods 18 to detect other forces such as the force parallel to the chord line, and twisting or torsional loads.

Cavities or apertures 28 and 26 are provided in the center section 16 and end sections 14 respectively to receive the corresponding end 34 and 36 of the flexure rod 18, as shown in FIGS. 5(b) and 5(c), and to secure the center section to the end sections. The apertures 26 and 28 are located in the end sections 14 and the center section 16 respectively so that the flexure rods 18 in the apertures share a common longitudinal axis 20.

Figure 1:
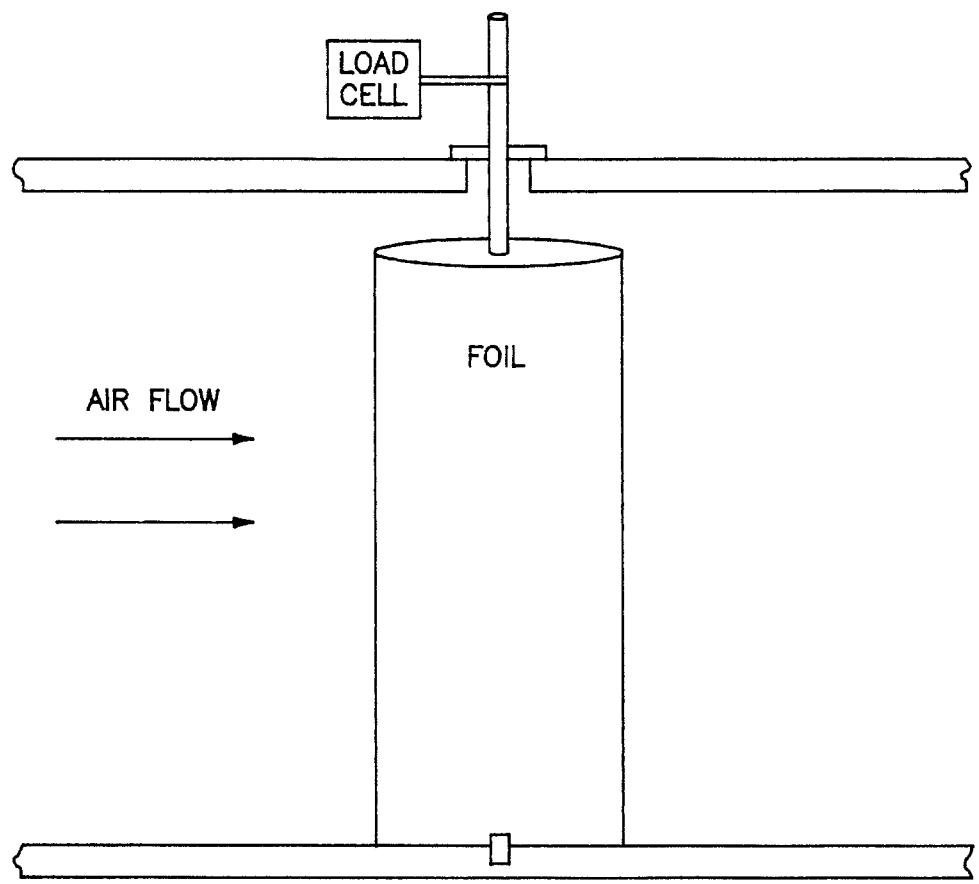
FIG. 1 illustrates a prior art apparatus for measuring forces from flowing air acting on a foil shaped body in a test tunnel.
Figure 3A:
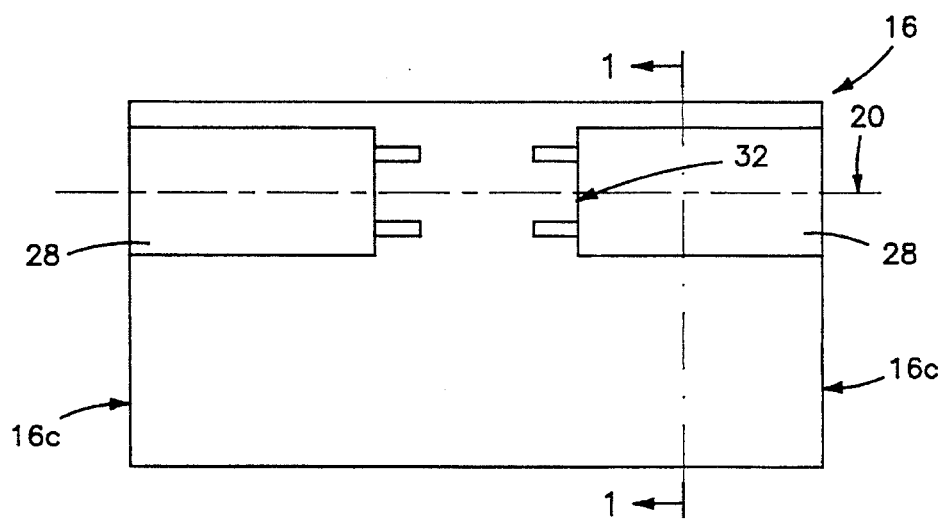
FIG. 3(a) is a top view of the center section of the test assembly of FIG. 2.

As shown in FIGS. 3(a) and 3(b), each aperture 28 is located in the cross-sectional side surface 16c of the center section 16 and is perpendicular to the side surface. Preferably, each aperture has a depth which assures that when the center and end sections 16 and 14 are secured together there is negligible relative motion between the sections and there is a minimal gap 15 between the opposing ends or edges of the center and end sections. Any gap 15 which exists should be a distance that does not disturb or destroy the flow field of the flowing water. However, if the gap is such that it affects the flow field, it may be sealed with a flexible material such as a silicone caulking compound.

As shown in FIG. 3(b), each aperture 28 in the center section, preferably has an elliptical cross section. Such a cross section is desirable from the standpoint of having a shape which will not weaken the center section so it bends or flexes during testing, thus yielding unreliable test results, or so it structurally fails during testing. While it is preferred to use an elliptical shape, it should be recognized that other shapes can be used so long as the above criteria can be met.

The cross-sectional shape of the aperture 28 complements the cross-sectional shape of the flexure rod end 34 (see FIG. 5(b)) so that, when the flexure rod 18 is inserted into the aperture 28, the surfaces of the rod end and the aperture cooperate to partially restrict motion of the rod with respect to the center section 16.

In addition to the cooperating surfaces, the flexure rod 18 is secured to the center section 16 by screwing or bolting the flexure rod end 34 to the center section by means of two threaded holes 30 located in the inside end 32 of the aperture 28. While the rod 18 is shown as being secured by means of threaded connections and cooperating surfaces, it should be recognized that it may also be secured to the center section 16 by any of a number of means known in the art for securing a rod to prevent motion, in all degrees of freedom, of the flexure rod end 34 with respect to the center section.

As shown in FIGS. 4(a) and 4(b), an aperture 26 is provided in the side surface 14a of each end section 14, which aperture is perpendicular to the side surface 14a. Aperture 26 may be separated into a first region 27a and a second region 27b. As viewed from the side surface 14a, the first region 27a has an elliptical cross section and the second region 27b has a circular cross section. The second region complements the cross-sectional shape of the flexure rod end 36 which end is inserted into and secured to the end section 14. Although illustrated as having two different cross sectional regions 27a and 27b, the aperture 26 could have a single cross section which complements the shape of end 36 of the flexure rod 18.

As with aperture 28, the flexure rod end 36 cooperates with the surface of the aperture 26 in the second region 27b to partially restrict the motion of the rod with respect to the end section. The flexure rod 18 is secured to the end section 14 by a bolt, not shown, which passes through the aperture 29 in the side surface 14b. The bolt engages a threaded aperture 38 in the end 36. It should of course be recognized that the flexure rod 18 may be secured to the end sections 14 by any of a number of means known in the art for securing a rod to prevent motion, in all degrees of freedom, of the flexure rod end 36 and with respect to the end section.

The end sections 14 may also include any suitable means (not shown) known in the art for pivotally mounting the end sections of the test body 12 in a test tunnel and for securing same in place during a test.

The flexure rod 18, as shown in FIGS. 5(a)–5(c), includes an end 34 having an elliptical cross section, an end 36 having a circular cross section, and a generally cylindrical shaped member 42 with different cross sections between the ends. Preferably, the flexure rod 18 is machined from a billet or rod of stainless steel material. While it is preferred to machine the flexure rod from a billet or rod of stainless steel material, the rod 18 may be formed by any other suitable technique known in the art. For example, it may be formed using welding.

The region 44 of the cylindrical shaped member 42 preferably has a larger diameter or cross section than a region 46, however, the surfaces of the two regions 44 and 46 are concentric. The length of the region 46 having a reduced cross section is established to permit sensing of the beam deflection while maintaining the require stiffness over the remaining region of the cylindrical member to assure negligible relative motion between the center and end sections. That portion of cylindrical member 42 in region 44 includes end 36 having the circular cross section and threaded aperture 38. The end 34 is a flanged member whose elliptical cross section surface is perpendicular to the longitudinal axis 48 of the flexure rod 18. The end 34 contains through holes 40 which align with the threaded holes 30 in center section aperture 28 so that end 34 can be bolted to center section 16.

The strain gauge 24 is affixed to the cylindrical member 42 in region 46. It makes a direct measurement of the force acting on the test body. The strain gauge 24 may be a semiconductor strain gauge which measures the microstrain of the beam. Alternatively, gauge 24 may be any suitable device known in the art for measuring beam microstrain.

A test assembly using the measuring device of the present invention may include a flexure rod that is approximately 3.130 inches long and having two cylindrical regions with diameters of approximately 0.375 and approximately 0.200 inches. The elliptical end 34 of the flexure rod may have a major axis of about 0.500 inches and a minor axis of about 0.188 inches. The threaded aperture 38 may be formed by drilling and threading the stainless steel material at end 36 for a 10–24 UNC bolt. The diameter of through holes 40 may be about 0.125 inches.

The test body may be cut into three sections with the active center section being about 5.970 inches wide and each inactive end section being about 1.5 inches wide. The center section apertures 28 may be approximately 2.115 inches deep and the major and minor axis of the elliptical cross section may be about 0.531 and about 0.219 inches respectively. The inactive and active end sections are secured to each other with the above described flexure rod.

One of the principal advantages of the measuring device and flexure test assembly of the present invention is that it can be entirely located within the test tunnel so there is no need for flexible connections between sensing devices outside the test tunnel and the test body inside the tunnel. There is also no need to use large plates affixed to the test body so the test body is not affected by flow field effects caused by gaps between the tunnel wall and the body. The measuring device of the present invention can be used for water tunnel or air tunnel testing and provides more accurate force measurements. The measuring device of the present invention has a quicker response time than the prior art. The quicker response time permits the measuring device to sense and measure forces or loads under transient fluid flow conditions.

The method for measuring loads on a test body 12 of the present invention comprises the steps of: providing a test body 12; cutting the test body into three sections including two end sections 14 and a center section 16; providing an aperture 28 in two opposed sides of the center section and an aperture 26 in each side of the end section opposite one of the apertures in the center section; providing each aperture 28 in the center section with a cross sectional shape which complements a cross-sectional shape of a first end portion 34 of a flexure member 18 and further comprises providing each aperture 26 in the end section with a cross sectional shape which complements the cross-sectional shape of a second end portion 36 of the flexure member; joining the center section to a respective one of the end sections by inserting the first end portion of the flexure member into a respective one of the apertures 28 in the center section so that there is no relative motion between the first end portion of the flexure member and the center section and by inserting the second end portion of the flexure member into a respective aperture 26 in an adjacent one of the end sections so that there is no relative motion between the second end portion of the flexure member and the end section; repeating the joining step for the other end portion; positioning the test body within a testing apparatus; causing a fluid medium to flow through the testing apparatus to impose loads and forces on the test body; and measuring at least one load imposed on the center section of the test body. The step of providing each aperture 28 with a cross-sectional shape comprises providing each center section aperture with a substantially elliptical shape and the step of providing each aperture 26 with a cross sectional shape comprises providing each end section aperture with a substantially circular cross sectional shape in at least one region.

While it is preferred to form the flexure rod from a stainless steel material, it can be made from any material which has the strength to withstand the forces generated, is compatible with the testing medium environment and minimizes the potential for galvanic corrosion between the flexure and test body. Additionally, the flexure rod may be of any shape or cross section which satisfies the requirements for securing the rod in the center and end sections. The rod material and/or cross section should also be such that there is negligible deflection of the beam under load, i.e., negligible relative movement between the sections.

The bolts used in the measuring device should be made from stainless steel or some other material that satisfies strength and corrosion requirements.

Still further, strain gauges may be affixed to one or both flexure rods.

It is apparent that there has been provided in accordance with this invention a hydrofoil force balance which fully satisfies the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A measuring device for measuring a component of a force acting on a test body, said device comprising:

said test body having a foil shaped center section;

said test body further having an end section positioned adjacent each of two opposed ends of said center section;

flexure means for connecting each said end section to said center section without creating any discontinuities on any surface of each said end section and on any surface of said center section, said flexure means having sufficient stiffness so that there is negligible relative motion between said center section and said end sections as a fluid medium flows past said test body;

said flexure means comprising a flexure member for connecting a respective end section to said center section, said flexure member having first and second ends and a beam member interconnecting said first and second ends;

said center section having an aperture adjacent each of said two opposed ends, said aperture receiving said first end of a respective flexure member to secure said center section to a respective one of said end sections, said aperture having a cross-sectional shape which complements the cross-sectional shape of said first end so that when said respective flexure member is inserted into said aperture surface of said first end and said aperture cooperate to partially restrict motion of said flexure member with respect to said center section; and said aperture and said first end each having a substantially elliptical cross-sectional shape.

2. A measuring device for measuring a component of a force acting on a test body, said device comprising:

said test body having a foil shaped center section;

said test body further having an end section positioned adjacent each of two opposed ends of said center section;

flexure means for connecting each said end section to said center section without creating any discontinuities on any surface of each said end section and on any surface of said center section, said flexure means having sufficient stiffness so that there is negligible relative motion between said center section and said end sections as a fluid medium flows past said test body; and each said end section having a first aperture for receiving said second end of said flexure member, said first aperture having a first region with a first cross-sectional shape and a second region with a second cross-ssectional shape.

3. The measuring device of claim 2 wherein said second end of said flexure member having an end portion with a cross-sectional shape which complements the shape of said second region so that surfaces of said second region cooperate with surfaces of said end portion to partially restrict motion of the flexure member with respect to said end section.

4. The measuring device of claim 3 wherein said first region has a cross-sectional shape substantially identical to the cross-sectional shape of said second region.

5. The measuring device of claim 2 wherein said end portion and said second region each have a substantially circular cross section.

6. The measuring device of claim 2 wherein said first region has a substantially elliptical cross-sectional shape.

7. The measuring device of claim 2 wherein said end section having a second aperture aligned with said first aperture, said second aperture receiving bolt means for securing said end section to said second end of said flexure member.

8. A system for testing and measuring forces on a foil shaped body within a fluid medium, said system comprising:

said foil shaped body being cut into a center section and two end sections;

said center section being connected to each of said end sections by a respective flexure member;

each said flexure member having sufficient stiffness so that there is negligible relative movement between said center section and said end sections as said fluid medium flows past said center section; and at least one strain gage attached to at least one of said flexure members, said strain gage measuring microstrains on said at least one flexure member;

said center section having an aperture machined into each end for receiving a first end portion of a respective flexure member;

said first end portion having a first cross-sectional shape;

said aperture having a cross-sectional shape which complements said first cross-sectional shape to partially restrict movement of said flexure member with respect to said center section;

each said end section having an aperture machined into an edge for receiving a second end portion of a respective flexure member;

said second end portion having a second cross-sectional shape different from said first cross sectional shape;

each said end section aperture having a cross-sectional shape which complements said second cross-sectional shape to partially restrict motion of the flexure member with respect to said end section;

said first end portion having a substantially elliptical cross-sectional shape; and said second end portion having a substantially circular cross-sectional shape.

9. A method for measuring loads on a test body comprising the steps of:

providing a test body;

cutting said test body into three sections including two end sections and a center section;

providing an aperture in two opposed sides of said center section and an aperture in each side of said end section opposite one of said apertures in said center section;

providing each aperture in said center section with a cross-sectional shape which complements a cross-sectional shape of a first end portion of a flexure member;

further providing each aperture in said end section with a cross-sectional shape which complements a cross-sectional shape of a second end portion of said flexure member;

joining said center section to a respective one of said end sections by inserting said first end portion of said flexure member into a respective one of said apertures in said center section so that there is no relative motion between the first end portion of the flexure member and the center section and by inserting said second end portion of said flexure member into a respective aperture in an adjacent one of said end sections so that there is no relative motion between the second end portion of the flexure member and the end section;

positioning said test body within a testing apparatus;

causing a fluid medium to flow through the testing apparatus to impose loads and forces on the test body; and measuring at least one load imposed on the center section of said test body;

said step of providing each aperture in said center section with a cross-sectional shape comprising providing each center section aperture with a substantially elliptical shape; and said step of providing each aperture in said end section with a cross-sectional shape comprising providing each end section aperture with a substantially circular cross sectional shape in at least one region.

* * * * *